United States Patent Office 3,109,308
Patented Nov. 5, 1963

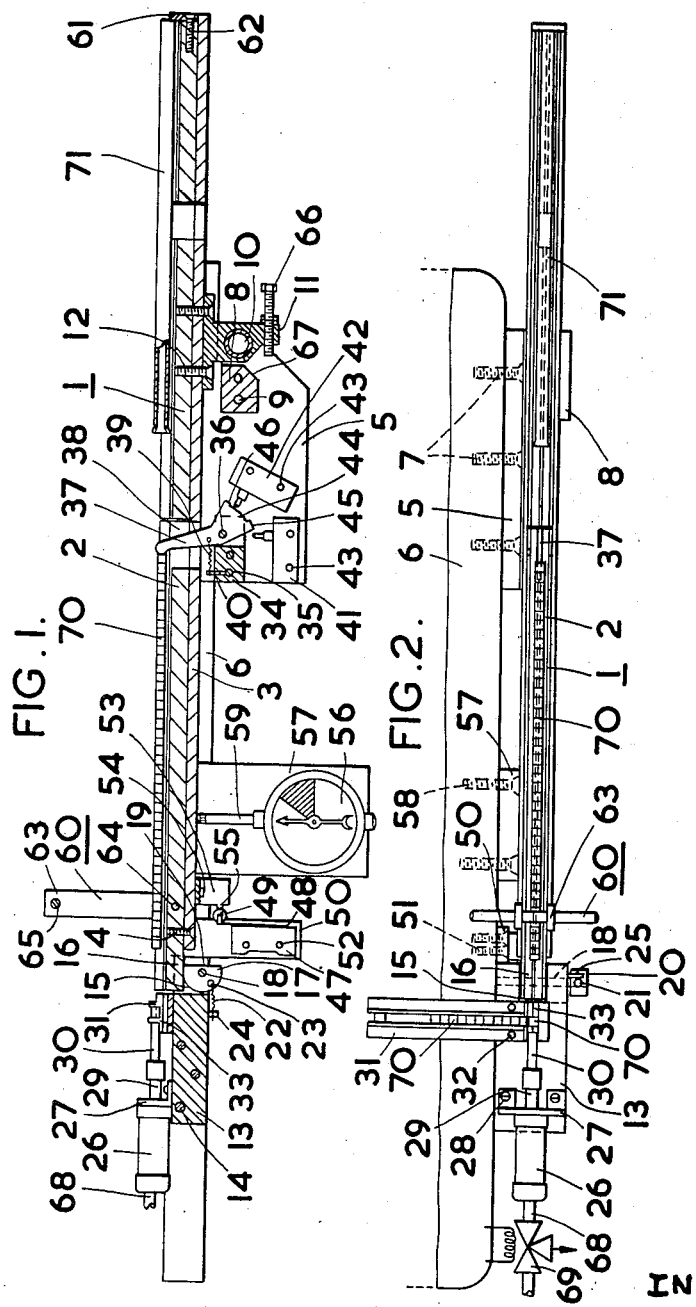

3,109,308
MEASURING APPARATUS
William Thompson, Lea, Preston, and Frank Roper Berry, Leyland, near Preston, England, assignors to United Kingdom Atomic Energy Authority, London, England
Filed June 29, 1960, Ser. No. 39,681
Claims priority, application Great Britain July 3, 1959
2 Claims. (Cl. 73—432)

This invention relates to measuring apparatus and provides such apparatus suitable in one form for the measurement of length and also weight of a column of repetitively produced bodies.

A known form of nuclear reactor fuel element comprises a cylindrical can containing a number of right cylindrical pellets of nuclear fuel material. The pellets lie end to end in the can and in order to ensure that such fuel elements are uniform one with another in respect to nuclear characteristics it is necessary to ensure that the weight of the pellets and their overall length within the can lie within pre-determined tolerance limits.

According to the invention measuring apparatus comprises a channel, means at one end of the channel for feeding repetitively produced bodies one by one on to said channel and for advancing each body as it is fed a set distance along the channel so that the bodies build up into a column on the channel, detector means at the other end of the channel movable when reached by the leading body in the column means operated by movement of said detector means for arresting the feed of bodies when the movement of the detector means exceeds a lower predetermined amount and means for indicating when the movement of the detector means exceeds an upper predetermined amount.

In order to determine whether the weight of the column of pellets lies within predetermined tolerance limits the channel member can be supported horizontally by a pivot at one point on its length and by resiliently deflectable means at another point on its length, said pivot allowing the channel member to rotate in a vertical plane and means being provided for measuring the degree of angular deflection of the channel member under the weight of the column of pellets to provide indication whether the weight of the column of pellets lies within said predetermined tolerance limits.

One embodiment of the invention will now be described by way of example with reference to the accompanying drawings in which:

FIG. 1 is a side elevation;
FIG. 2 is a plan view.

In the drawings there is shown a horizontally arranged V section channel 1 comprising two parallel chamfered strips 2 mounted on a base plate 3 by bolts 4. A plate 5 is attached to a supporting table 6 by bolts 7 and a forked hinge block 8 is mounted on the plate 5 by bolts 9. A pivot pin 10 is carried by the hinge block 8 and the channel 1 is pivoted on the pin 10 by a hinge arm 11 which is fixed to the channel 1 by bolts 12. A block 13 which is fixed to the table 6 by bolts 14 has an end slot 15 accommodating the end 16 of the channel 1. The channel 1 is normally held horizontal by a releasable stop in the form of a cam 17 rotatable in the slot 15. The cam 17 is carried by a shaft 18 extending across the slot 14 and is of general circular shape except for a flat 19. The shaft 18 has an integral boss 20 which is fitted with a radially extending handle 21. A light coil spring 22 which is fitted between a pin 23 carried by the cam 17 and a pin 24 carried by the block 13 holds the cam 17 in the position shown in FIG. 1 i.e. with the handle 21 held against a stop pin 25 carried by the block 13. A single acting air cylinder 26 is mounted on a bracket 27 attached to the block 13 by bolts 28. The air cylinder 26 operates a shaft 29 which carries a plunger 30 for feeding repetitively produced bodies such as right cylindrical pellets onto and a set distance along the channel 1.

The shaft 29 is spring loaded to hold the plunger 30 in a retracted position as shown in the drawings when the air cylinder 26 is exhausted to atmosphere. A rectangular section chute 31 leads onto the block 13 at right angles to the channel 1. The chute 31 is attached to the block 13 by bolts 32 and terminates in a transverse V section groove 33 which forms a continuation of the channel 1 when the channel 1 is in a horizontal position. A forked lever block 34 mounted on the plate 5 by bolts 35 carries a pivot pin 36. A lever 37 pivoted on the pin 36 projects through a slot 38 in the channel 1. The lever 37 is biassed towards the position shown in FIG. 1 by a light coil spring 39 which extends between the lever 37 and a pin 40 carried by the lever block 34. Two microswitches 41 and 42 are mounted on the plate 5 by bolts 43. The lever 37 has a cam face 44 with two projections 45 and 46 and depending on the degree of rotation of the lever 37 the projection 45 operates the microswitch 41 while the projection 46 operates the microswitch 42. A microswitch 47 having an operating lever 48 fitted with a roller 49 is mounted on a plate 50 carried by the table 6. The plate 50 is attached to the table 6 adjacent the end 16 of the channel 1 by bolts 51 and the microswitch 47 is mounted on the plate 58 by bolts 52. A flanged plate 53 fixed to the channel 1 by bolts 54 has a projection 55 which, when the channel 1 is located horizontally, holds the lever 48 of the microswitch 47 so that the microswitch is held open. A plunger operated dial gauge 56 is mounted on a plate 57 attached to the table 6 by bolts 58. The dial gauge 56 is positioned so that the channel 1 bears against the plunger 59 of the dial gauge 56.

The channel 1 has a lifting handle 60 fitted adjacent its end 16 and an end stop 61 is attached to the channel 1 at its other end by bolts 62. The lifting handle 60 comprises a pair of parallel plates 63 pivoted on a transverse pin 64 carried by the channel 1 and fitted with a transverse lifting bar 65. The angle through which the channel 1 can be rotated clockwise by means of the lifting handle 60 is limited by an adjustable bolt 66 fitted to the hinge arm 11. The bolt 66 contacts a face 67 on the hinge block 8 to a limit rotation of the channel 1. The air cylinder 26 is provided with a compressed air supply pipe 68 and a solenoid operated air valve 69 (see FIG. 2) is fitted to the supply pipe 68 to control the supply of compressed air to the cylinder 26.

In use of the apparatus, the channel 1 is held horizontal by the cam 17 as shown in FIG. 1 and compressed air is alternately supplied to and exhausted from the air cylinder 26 under control of the valve 69 so that the plunger 30 is moved in a reciprocatory manner between a point on the transverse groove 33 in the chute 31 and a fixed point on the channel 1. By this means right cylindrical pellets 70 fed down the chute 31 into the transverse groove 33 are pushed one by one onto the channel 1. Thus a column of the pellets 70 is built up on the channel 1 until a point is reached where the pushing of a pellet 70 onto the channel 1 forces the leading pellet of the column of pellets 70 against the lever 37 which is rotated clockwise against the biassing action of the coil spring 39. If the overall length of the column of pellets 70 is above a predetermined lower tolerance limit the lever 37 is rotated through an angle such that the projection 45 on the lever 37 operates the microswitch 41. The operation of the microswitch 41 controls the solenoid operated valve 69 so that the air cylinder 26 is exhausted to atmosphere. The valve 69 is arranged to hold the air cylinder 26 exhausted to atmosphere (irrespective of later release of the microswitch 41 until an overriding control is operated) so that the supply of further pellets to the channel 1 is thus terminated. If the overall length of the column of pellets 70 is above a predetermined upper tolerance limit the lever 37 is rotated through an angle such that the projection 46 on the lever 37 operates the microswitch 42. The operation of the microswitch 42 causes a warning light to be switched on indicating that the length of the column of pellets is above the upper tolerance limit and the column of pellets 70 is rejected or a pellet of shorter length is substituted for one of the column of pellets to bring the length within the tolerance limits. However if the length of the column of pellets is between the upper and lower tolerance limits the microswitch 42 is not operated and the cam 17 is rotated manually to release the channel 1 so that it is supported by the dial gauge 56. The dial gauge 56 is marked to define limits of deflection corresponding to lower and upper tolerance limits in respect of the weight of the column of pellets. Alternatively a sensitive deflection type weighing machine may be positioned in place of the dial gauge 56 calibrated in terms and lower and upper tolerance limits in respect of the weight of the column of pellets. If the weight of the column of pellets is outside the tolerance limits the pellets are rejected but if within the limit the channel 1 is tilted clockwise by means of the handle 60. Tilting of the channel 1 in this manner clears the lever arm 37 from the slot 38 in the channel 1 so that the column of pellets 70 is freed to slide down the channel, into a cylindrical can 71 placed on the channel 1 against the end stop 61. After loading the pellets into the can 71 the apparatus is reset to the condition shown in FIG. 1 by returning the channel 1 to rest horizontally on the cam 17. The microswitch 47 is spring loaded to close when the operating lever 48 is not held by the projection 55 on the flanged plate 53, i.e. when the channel 1 is not in a horizontal position. Closure of the microswitch operates the solenoid operated valve 69 to exhaust and to hold the air cylinder 26 exhausted to atmosphere so that the air cylinder 26 cannot be operated whilst the channel 1 is in a non-horizontal position.

We claim:

1. Measuring apparatus comprising a channel, a reciprocating pushing member extending over one end of the channel for feeding cylindrical pellets one by one onto said channel in end to end relationship and for advancing each body as it is fed a set distance along the channel so that the bodies build up into a column on the channel, detector means at the other end of the channel movable when reached by the leading body of the column, means operated by movement of said detector means for arresting the feed of such bodies when the movement of the detector means exceeds a lower predetermined amount and means for indicating when the movement of the detector means exceeds an upper predetermined amount.

2. Measuring apparatus according to claim 1 wherein said channel is supported horizontally by a pivot at one point on its length allowing rotation in a vertical plane and by a releasable stop at a second point on its length preventing the channel rotating whilst it is being loaded said channel bearing against resiliently deflectable means at a third point on its length, said channel being rotatable in a vertical plane about said pivot on release of said releasable stop and means being provided for measuring the degree of angular deflection of the channel against the action of the resiliently deflectable means under the weight of the column of pellets to provide indication whether the weight of the column of pellets lies within predetermined tolerance limits.

References Cited in the file of this patent

UNITED STATES PATENTS

| | | |
|---|---|---|
| 2,102,317 | Gwinn | Dec. 14, 1937 |
| 2,297,253 | Scotte | Sept. 29, 1942 |